United States Patent [19]

Morimoto

[11] Patent Number: 5,320,302
[45] Date of Patent: Jun. 14, 1994

[54] BAITCASTING REEL HAVING A SWING ARM TYPE CLUTCH CONTROLLER

[75] Inventor: Shinichi Morimoto, Nishinomiya, Japan

[73] Assignee: Shimano Inc., Osaka, Japan

[21] Appl. No.: 886,104

[22] Filed: May 21, 1992

[30] Foreign Application Priority Data

May 23, 1991 [JP]   Japan ............................... 3-036672[U]

[51] Int. Cl.$^5$ ............................................. A01K 89/015
[52] U.S. Cl. ...................................................... 242/261
[58] Field of Search ................................ 242/257–262, 242/269–271

[56] References Cited

U.S. PATENT DOCUMENTS

| | | | |
|---|---|---|---|
| 2,271,883 | 2/1942 | Bannister | 242/257 X |
| 2,743,067 | 4/1956 | Stratton | 242/257 |
| 3,166,268 | 1/1965 | Clark | 242/260 X |
| 3,652,031 | 3/1972 | Kosek | 242/269 |
| 4,512,536 | 4/1985 | Sato | 242/261 |
| 4,575,024 | 3/1986 | Kaneko | 242/261 |

*Primary Examiner*—Daniel P. Stodola
*Assistant Examiner*—Michael R. Mansen
*Attorney, Agent, or Firm*—Dickstein, Shapiro & Morin

[57]   ABSTRACT

A baitcasting reel comprises a handle shaft including a handle, a spool shaft including a spool, a transmission mechanism for transmitting drive between the handle and spool, a clutch mounted in the transmission mechanism, and a clutch control mechanism for operating the clutch. The clutch control mechanism includes a swing arm and a clutch controller. The swing arm has one end thereof supported for pivotal movement about an axis of the handle shaft, and the other end extending beyond the spool shaft. The clutch controller is connected to the other end of the swing arm to be linearly movable between clutch engaging and disengaging positions.

5 Claims, 2 Drawing Sheets

BAITCASTING REEL HAVING A SWING ARM TYPE CLUTCH CONTROLLER

BACKGROUND OF THE INVENTION

1. Field of the Invention

This invention relates to a baitcasting reel having a swing arm type clutch controller.

2. Description of the Related Art

In this type of clutch control structure for a baitcasting reel, as disclosed in Japanese Utility Model Publication Kokai No. 1990-29270 for example, the clutch controller is mounted slidably through a slot defined in a peripheral surface of a reel body.

The above prior structure includes a crank device having one end thereof pinned to the clutch controller through the slot and the other end connected to a clutch. The clutch controller is slidable along the peripheral surface of the reel body to swing the crank device for engaging and disengaging the clutch. The clutch controller has a non-circular locus of movement or, even if the locus of movement is circular, its center is displaced from a pivotal axis of the crank device. Consequently, when the clutch controller is in a position to maintain engagement of the clutch, excessive play is present between the clutch controller and reel body. This renders the clutch controller unstable in right and left directions, often with chattering. Conversely, when moving to a position to disengage the clutch, the clutch controller is pressed against the reel body. The prior clutch control structure is far from satisfactory, with the excessive play in the clutch engaging position and the unsmooth movement toward the declutching position or vice versa.

SUMMARY OF THE INVENTION

The object of the present invention is to provide a clutch control structure for a baitcasting reel having a simple modification made thereto for excellent operability.

The above object is fulfilled, according to the present invention, by a baitcasting reel comprising a handle shaft including a handle, a spool shaft, a clutch controller opposed to the handle shaft across the spool shaft, and a swing arm pivotable about the handle shaft and having a distal end thereof directly connected to the clutch controller.

This construction has the following functions and effects:

(a) The swing arm is directly connected to the clutch controller and pivotally connected to a reel body. This allows the clutch controller to be attached to the reel body with high precision, compared with the clutch controller slidably mounted on the reel body.

(b) The clutch controller in the present invention is directly connected to the swing arm to be movable together. This assures a smooth operation, compared with the prior art construction in which sliding movement of the clutch controller is converted into a rotary motion of the clutch through the crank device.

(c) Since the swing arm connected to the clutch controller is pivotable about the handle shaft, the swing arm may have an extended length to allow approximately linear movement of the clutch controller. Such movement of the clutch controller involves little change in its posture, thereby fascilitating operation.

(d) According to the present invention, the swing arm may be attahced to a boss fitted on the handle shaft or to the handle shaft itself. No additional shaft or the like is required for supporting the swing arm.

Thus, the present invention employs a swing type operating mode to reduce chattering as encountered with the known sliding type mode. The simple improvement consisting in the extended length of the swing arm allows approximately linear movement of the clutch controller with little change in its posture to facilitate operation of the clutch controller. The invention provides the further advantage of requiring no additional means for supporting the swing arm.

Other features and advatanges of the present invention will be apparent from the following description of the preferred embodiment taken with reference to the accompanying drawings.

DETAILED DESCRIPTION OF THE PREFERRED EMBODIMENT

Figure 1:
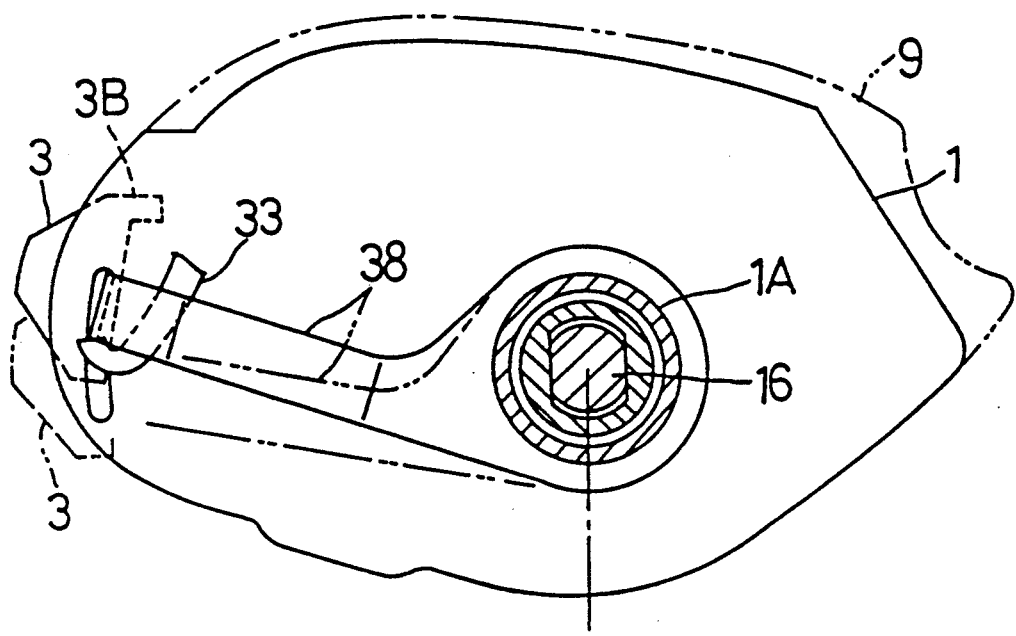
FIG. 1 is a schematic side view showing how a swing arm is attached to a body of a baitcasting reel according to the present invention.
Figure 2:
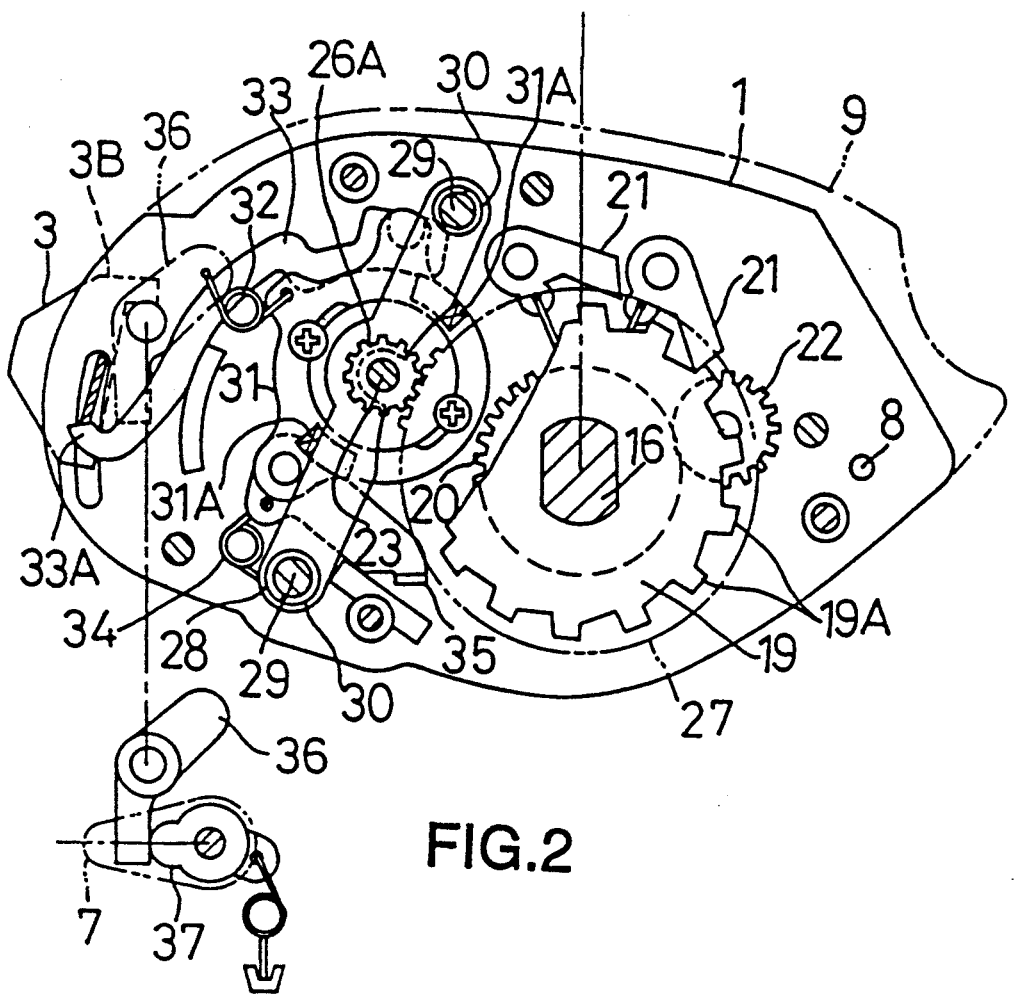
FIG. 2 is a side view in vertical section showing an interlocking structure between a handle shaft and a clutch controller.
Figure 3:
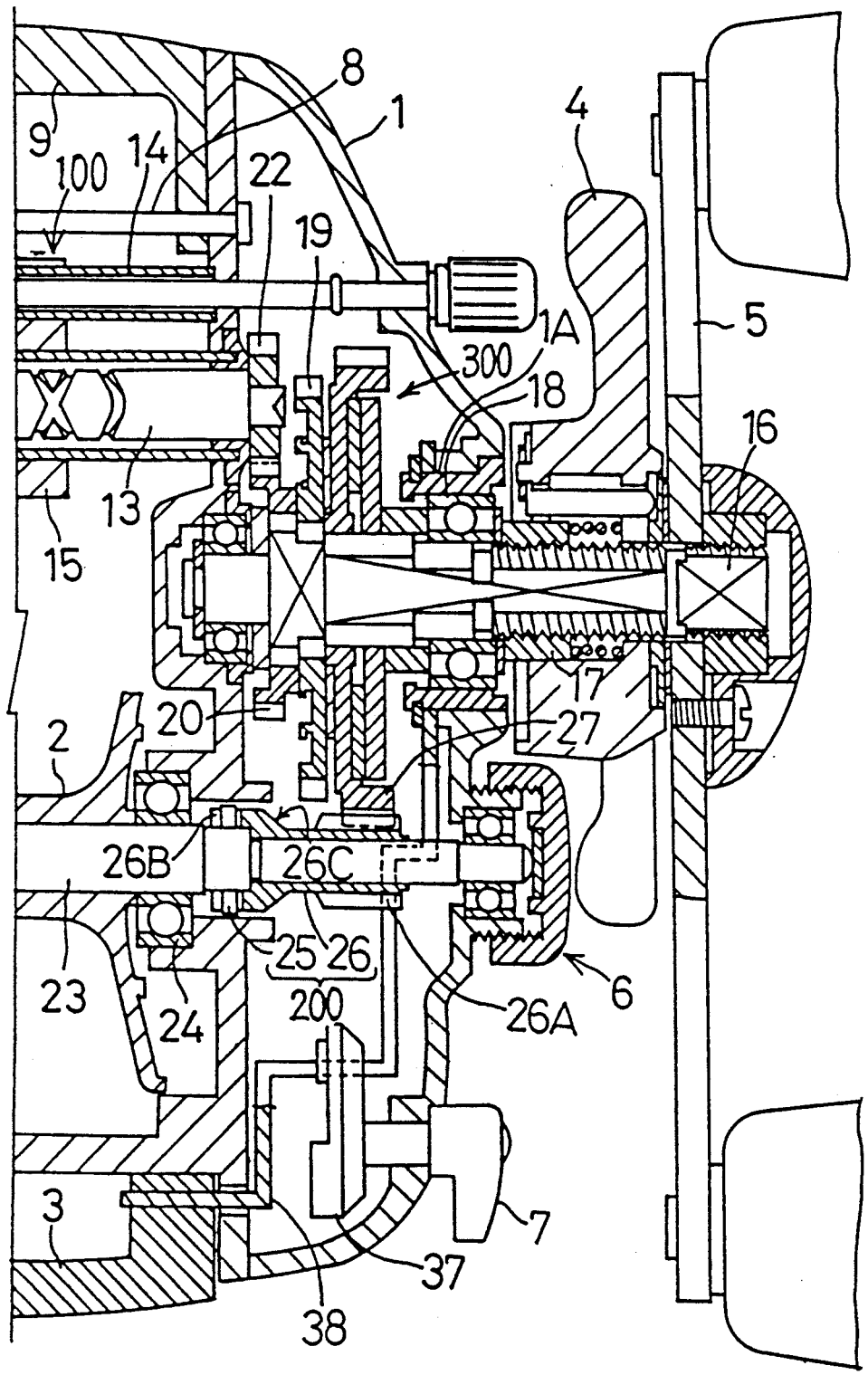
FIG. 3 is a plan view in cross section of a right half of the baitcasting reel showing how the swing arm is attached.

FIGS. 1 through 3 show a batcasting reel according to the present invention. The reel comprises right and left side bodies 1 constituting a reel body and supporting therebetween a level wind mechanism 100, a spool 2 for winding a fishing line, and a clutch controller 3 mounted rearwardly of the spool 2. The right side body 1 supports a drag controller 4, a handle 5 disposed forwardly of the spool 2 and operable to take up the fishing line, a cast controller 6, and a control mode lever 7. The reel also includes a cover 9 pivotable about a support shaft 8 for opening and closing the reel interior.

The level wind mechanism 100 includes a screw shaft 13, and a line guide 15 reciprocable right and left along a guide rod 14 with rotation of the screw shaft 13.

As shown in FIG. 3, the right side body 1 rotatably supports a handle shaft 16 connected to the handle 5 disposed forwardly of a spool shaft 23 described later. The drag controller 4 is mounted on a nut 17 meshed with a screw portion of the handle shaft 16. When the drag controller 4 is turned, a pressing force corresponding to an amount of this turning operation is transmitted from the nut 17 to a drag mechanism 300 through a bearing 18.

The handle shaft 16 supports the drag mechanism 300, a ratchet wheel 19 and a transmission gear 20. A pair of ratchet pawls 21 are engageable in different phases of rotation with teeth 19A o fthe ratchet wheel 19 to prevent backward turning of the handle 5. The transmission gear 20 is meshed with an input gear 22 mounted on the screw shaft 13 for driving the level wind mechanism 100.

The spool 2 has the spool shaft 23 rotatable therewith. The spool shaft 23 is supported by bearings 24, and has an engaging pin 25 attached to an intermediate position thereof. Further, the spool shaft 23 supports a clutch sleeve 26 slidably mounted thereon to be engageable with the pin 25.

The clutch sleeve 26 has an input gear 26A meshed with an output gear 27 of the drag mechanism 300. When the handle 5 is turned with an engaging portion 26B of the clutch sleeve 26 engaged with the pin 25, the spool 2 is rotated to wind a fishing line (not shown) thereon.

The pin 25 and clutch sleeve 26 constitute a clutch mechanism 200. This clutch mechanism 200 is disengaged for a bait casting action.

As shown in FIG. 2, the clutch sleeve 26 is engaged with a shifter 28 supported on a pair of support shafts 29 extending parallel to the spool shaft 23. Coil springs 30 are mounted on the support shafts 29 to urge the shifter 26 to a clutch engaging position. An annular cam 31 defining a pair of cam surfaces 31A projecting therefrom is rotatably mounted coaxially with the spool shaft 23. The pair of cam surfaces 31A presses and operates the shifter 28 to a declutching position.

A first toggle spring 32 acts on the annular cam 31 to set the annular cam 31 to a first control position to engage the clutch mechanism 200 and to a second control position to disengage the clutch mechanism 200. The annular cam 31 is movable between the first control position and second control position by means of an interlocking element 33 extending between the annular cam 31 and clutch controller 3 and pivotable about substantially the same axis as the annular cam 31. Further, the annular cam 31 pivotally supports a return arm 35 on which a second toggle spring 34 acts. A contact arm 37 is rigidly connected to the control mode lever 7 for contacting a pivot arm 36 supporting the first toggle spring 32, to switch position of a dead point of the first toggle spring 32.

The control mode lever 7 is operable to select between a toggle mode and a momentary mode. In the toggle mode, the clutch mechanism 200 remains engaged when the clutch controller 3 is released after being pressed with a thumb. In the momentary mode, the clutch controller 3 returns to the original position to re-engage the clutch mechanism 200 when the clutch controller 3 is released.

When the clutch mechanism 200 is disengaged in the toggle mode, the return arm 35 is switched to a position in which a free end thereof can interfere with the teeth 19A of ratchet wheel 19. Thus, when the handle 5 is turned in the line winding direction, its operating force transmitted through the ratchet wheel 19 and return arm 35 rotates the annular cam 31 beyond the dead point. As a result, the clutch mechanism 200 is engaged by the forces of the first toggle spring 32 and the coil springs 30 mounted on the support shafts 29.

As shown in FIG. 3, the right side body 1 includes a boss 1A extending inwardly and having the bearing 18 for supporting the handle 5. A swing arm 38 is directly connected to a distal end region of the clutch controller 3. This swing arm 38 has a proximal end thereof fitted to the boss 1A. The swing arm 38 and clutch controller 3 are swingable about the handle shaft 16.

The clutch controller 3 is movable up and down approximately linearly. Thus, a thumb rest surface 3B defined on an upper surface of the clutch controller 3 also makes parallel movement. As shown in FIG. 2, the interlocking element 33 connected to the annular cam 31 defines a bent lower end 33A for contacting the swing arm 38. Through this bent lower end 33A the swing arm 38 is interlocked to the annular cam 31.

The above embodiment may be modified as follows:

(a) The proximal end of the swing arm 38 may be directly fitted to the handle shaft 16.

(b) The swing arm 38 may be formed separately from or integrally with the clutch controller 3 as long as these are movable together.

(c) The positions of the clutch controller 3 and handle shaft 16 may be interchanged with respect to the spool shaft 23.

What is claimed is:

1. A baitcasting reel, comprising:
   a handle and a handle shaft, said handle being supported by said handle shaft;
   a spool for winding a fishing line, and a spool shaft provided separately and spaced apart from said handle shaft, said spool being supported by said spool shaft;
   transmission means for transmitting drive between said handle and said spool;
   said transmission means including a clutch, said clutch including an engaging element attached to said spool shaft and a clutch sleeve slidably mounted on said spool shaft; and
   clutch control means for controlling said clutch, said clutch control means including a clutch controller and a swing arm having first and second ends, said first end of said swing arm being supported for pivotal movement about the axis of said handle shaft, said second end of said swing arm being connected to said clutch controller; and
   wherein said baitcasting reel has a rear peripheral face, said clutch controller being disposed adjacent said rear peripheral face.

2. A baitcasting reel as claimed in claim 1, wherein said first end of said swing arm is annular and at least partially surrounds said handle shaft.

3. A baitcasting reel as claimed in claim 1, further comprising a bearing (18) for supporting said handle shaft, said bearing having an outer race, and a boss (1A) fitted on said outer race, and wherein said first end of said swing arm is supported by said boss and at least partially surrounds said boss.

4. A baitcasting reel as claimed in claim 1, further comprising an annular cam and a pinion gear, and an elongate shifter engaged with said annular cam, and an interlocking element for interlocking said clutch controller and said annular cam.

5. A baitcasting reel, comprising:
   a handle and a handle shaft, said handle being supported by said handle shaft;
   a spool for winding a fishing line, and a spool shaft provided separately and spaced apart from said handle shaft, said spool being supported by said spool shaft;
   transmission means for transmitting drive between said handle and said spool;
   said transmission means including a clutch, said clutch including an engaging element attached to said spool shaft and a clutch sleeve slidably mounted on said spool shaft; and
   clutch control means for controlling said clutch, said clutch control means including a clutch controller and a swing arm having first and second ends, said first end of said swing arm being supported for pivotal movement about the axis of said handle shaft, said second end of said swing arm being connected to said clutch controller; and wherein said baitcasting reel has a rear peripheral face, said clutch controller being disposed adjacent said rear peripheral face; and wherein said spool shaft is located between said handle shaft and said clutch controller such that said clutch controller moves along an approximately linear path, and such that the orientation of said clutch controller is not substantially changed as said clutch controller moves along said approximately linear path.

* * * * *